(12) United States Patent
Nakano et al.

(10) Patent No.: US 8,921,488 B2
(45) Date of Patent: *Dec. 30, 2014

(54) RESIN COMPOSITION FOR EXTRUSION COATING, AND LAYERED FILM AND METHOD FOR PRODUCING THE SAME

(75) Inventors: Shigenori Nakano, Ichihara (JP); Kaoru Suzuki, Ichihara (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/997,836

(22) PCT Filed: Dec. 14, 2011

(86) PCT No.: PCT/JP2011/078946
§ 371 (c)(1),
(2), (4) Date: Jun. 25, 2013

(87) PCT Pub. No.: WO2012/090710
PCT Pub. Date: Jul. 5, 2012

(65) Prior Publication Data
US 2013/0337279 A1    Dec. 19, 2013

(30) Foreign Application Priority Data

Dec. 27, 2010 (JP) ................. 2010-291268

(51) Int. Cl.
| C08L 23/10 | (2006.01) |
| C08L 23/00 | (2006.01) |
| B32B 27/32 | (2006.01) |
| B29C 47/02 | (2006.01) |
| C09D 133/02 | (2006.01) |
| B29C 47/00 | (2006.01) |
| B32B 27/08 | (2006.01) |
| C08L 23/08 | (2006.01) |
| B32B 27/30 | (2006.01) |

(52) U.S. Cl.
CPC ..... *C09D 133/02* (2013.01); *B29C 2947/92695* (2013.01); *B32B 2323/10* (2013.01); *B32B 27/32* (2013.01); *B29C 2947/92704* (2013.01); *B29C 47/025* (2013.01); *B29C 47/0064* (2013.01); *B32B 27/08* (2013.01); *B29C 2947/92857* (2013.01); *C08L 23/0869* (2013.01); *B32B 27/308* (2013.01); *B29C 47/0021* (2013.01)
USPC ........ 525/191; 525/221; 525/240; 427/407.1; 428/500

(58) Field of Classification Search
CPC . C08L 23/10; C08L 23/0869; C08L 23/0876; C08L 2203/162; C08L 2305/02; B05D 7/04; B05B 27/30; B05B 27/32; B32B 2037/243; B32B 2270/00
USPC ......... 525/191, 221, 240; 427/407.1; 428/500
See application file for complete search history.

(56) References Cited

U.S. PATENT DOCUMENTS

| 4,346,196 A | 8/1982 | Hoh et al. |
| 4,550,141 A | 10/1985 | Hoh |
| 2005/0266257 A1 | 12/2005 | Lee et al. |
| 2011/0071259 A1 | 3/2011 | Nakano et al. |
| 2012/0108754 A1* | 5/2012 | Nakano et al. ............... 525/221 |
| 2013/0079457 A1* | 3/2013 | Nakano et al. ............... 524/522 |

FOREIGN PATENT DOCUMENTS

| JP | 58-215437 | 12/1983 |
| JP | 1-49382 | 10/1989 |
| JP | 5-11549 | 2/1993 |
| JP | 2008-500450 | 1/2008 |
| WO | 2009145235 | 12/2009 |
| WO | 2011004754 | 1/2011 |

OTHER PUBLICATIONS

International Search Report dated Mar. 13, 2012 filed in PCT/JP2011/078946.
Chinese Office Action dated Nov. 7, 2013 filed in corresponding Chinese patent application No. 201180062943.1 and partial English translation thereof.

* cited by examiner

*Primary Examiner* — Nathan M Nutter
(74) *Attorney, Agent, or Firm* — Rankin, Hill & Clark LLP

(57) ABSTRACT

The present invention provides a resin composition for extrusion coating, the composition including (1) at least one of a copolymer of ethylene and α,β-unsaturated carboxylic acid or an ionomer thereof and (2) a homopolypropylene, wherein a content of the component (2) is 3 to 12% by mass based on the total mass of the component (1) and the component (2) and has a melt flow rate (at a load of 2160 g and 190° C., JIS K7210) of 4.0 g/10 min. or more.

9 Claims, 2 Drawing Sheets

RESIN COMPOSITION FOR EXTRUSION COATING, AND LAYERED FILM AND METHOD FOR PRODUCING THE SAME

TECHNICAL FIELD

The present invention relates to a resin composition for extrusion coating suitable for heat sealing, and a layered film and a method for producing the film.

BACKGROUND ART

Conventionally, contents in a tubular or flat film package have been packaged by sealing the package with a heat seal (lock seal) to protect the contents during, for example, storage and transport. Regarding increase of the seal strength in case of sealing a package with a lock seal, various measures has been considered in view of, for example, a package material, a packaging machine, and packaging conditions. In view of a package material, for example, it is known to use an ethylene-based polymer such as a polyethylene and an ethylene-vinyl acetate copolymer. Among these, ionomers are widely used since they are excellent in, for example, hot tack property, low-temperature seal property, and oil resistance.

On the other hand, when it is desired that the contents be taken out of the packaging material while keeping the contents intact, with a certain degree of a lock seal property, a method for heat sealing in which a sealing section can be peeled and opened by an opening force (peelable seal) is also carried out.

For a package which can be peelably sealed after sealing with a lock seal, for example, a polymeric material including 80 to 93% by weight of an ethylene/acid ionomer and 7 to 20% by mass of a propylene/α-olefin copolymer is disclosed (see, for example, Patent Document 1). Such material can be lock sealed and peelably sealed depending on the temperature. When this polymer material is used to form a film or a layer for filling and packaging by a packaging machine, it is possible to obtain a package having both a lock seal section and a peelable seal section in one packaging material, by forming the lock seal on the back side or bottom under high temperature conditions and forming the peelable seal at the top under low temperature conditions. As the polymer material to be used for such a package, for example, a layered packaging material in which a base layer such as a polyester layer, and an ionomer layer are layered with an adhesive layer interposed therebetween, and the like are known. In this layered packaging material, it is necessary to exhibit a certain level of seal strength suitable for a peelable seal at a low-temperature sealing condition and exhibit higher seal strength suitable for a lock seal at a high-temperature sealing condition, in terms of the relationship between the sealing temperature and the seal strength.

Furthermore, in practice, it is necessary to stably form the lock seal and the peelable seal. In particular, it is required to have a temperature range in which the peelable seal can be formed stably, that is, the temperature range (plateau region) in which the seal strength of the peelable seal section does not vary significantly depending on the temperature.

As a technique regarding such a seal form, a layered film for packaging, which is provided a seal layer of a polymer composition formed of 60 to 95 parts by weight of a metal salt of an ethylene/α,β-unsaturated carboxylic acid-based copolymer and 40 to 5 parts by weight of an ethylene/α,β-unsaturated carboxylic acid ester copolymer, is disclosed (see, for example, Patent Document 2). Here, it is considered that a seal strength that is relatively low and also constant over a wide temperature range can be obtained, that is, the plateau region exhibits, and a high seal strength is exhibited under high-temperature sealing conditions.

Furthermore, a resin composition which includes (A) an ionomer including a copolymer of ethylene and α,β-unsaturated carboxylic acid and a terpolymer of ethylene, α,β-unsaturated carboxylic acid, and α,β-unsaturated carboxylic acid ester and (B) a propylene polymer, and which includes the constitutional unit derived from the α,β-unsaturated carboxylic acid ester in an amount of 1 to 4.5% by mass based on the total mass of the (A) ionomer see, for example, Patent Document 3) is known as a resin composition which exhibits high seal strength at a high temperature range in lock sealing (for example, 20 N/15 mm or more at 180° C. or higher) and a plateau region in which higher seal strength than convention is constantly exhibited over a broad temperature range without significant dependence on temperature, when a peelable seal is formed.

A resin composition which provide a lock seal and a peelable seal which exhibit a relatively low seal initiation temperature and which generate low static charge buildup is also known (see, for example, Patent Document 4).

A composition which includes a terpolymer of ethylene, alkyl (meth)acrylate (ester), and ethylene-based unsaturated carboxylic acid and an ionomer having ethylene and ethylene-based unsaturated carboxylic acid is also known as a heat sealing composition (see, for example, Patent Documents 5 and 6).

A resin composition which contains an ionomer including a copolymer of ethylene and α,β-unsaturated carboxylic acid and a terpolymer of ethylene, α,β-unsaturated carboxylic acid, and α,β-unsaturated carboxylic acid ester, and (B) a propylene polymer; wherein the melt flow rate of the ionomer at a processing temperature when a film is formed by melt T-die casting method is 50 to 250% of the MFR of the propylene polymer under the same conditions is also known as a composition which can provide, especially by T-die casting, a film suitable for a lock seal and a peelable seal (see, for example, Patent Document 7).

PRIOR ART DOCUMENT

Patent Document

Patent Document 1: Japanese Patent Application Publication (JP-B) No. H01-49382
Patent Document 2: JP-B No. H05-11549
Patent Document 3: WO2009/145235
Patent Document 4: Japanese Patent Application Laid-Open (JP-A) No. 2008-500450
Patent Document 5: U.S. Pat. No. 4,346,196
Patent Document 6: JP-B No. S58-215437
Patent Document 7: WO2011/004754

DISCLOSURE OF INVENTION

Problem to be Solved by the Invention

As a method for producing, a package material (layered film) which has heat seal functionality, a method which forms a film for heat sealing using a heat sealing resin composition by inflation, T-die casting, or the like, and which laminates the resulting film for heat sealing and a substrate film by a laminator or the like to form a layered film is used.

A method which has a higher productivity than the above method includes extrusion coating a heat sealing resin composition to directly form a sealing layer on a substrate film thereby forming a layered film.

The extrusion coating is an important application field. Such coating is a process of directly coating a variety of substrate such as paper, paperboard, a metallic foil, and a transparent film with extruded resin. By such coating, a multilayer structure is formed and useful properties for various applications are provided.

The extrusion coating, however, requires a higher processing temperature (for example, about 260 to 300° C.) compared with the processing temperature of the inflation (for example, about 170 to 180° C.) and the processing temperature of the T-die casting (for example, about 200 to 250° C.).

As a result of research of present inventor, it has found that a sealing layer formed of a conventional resin composition as described above by extrusion coating (in particular, extrusion coating at a processing temperature of 260 to 300° C.) may exhibit seal strength unsuitable for a peelable seal at a low-temperature sealing condition (for example, 120° C. to 140° C.) (i.e., extremely high or extremely low seal strength at a low-temperature sealing condition), or low seal strength insufficient for a lock seal at a high-temperature sealing condition (for example, 170° C. or higher).

The present invention has been made taking the above-described situation into consideration. There is a need for a resin composition for extrusion coating which exhibits high seal strength suitable for a lock seal at a high-temperature sealing condition (for example, 170° C. or higher) and exhibits a certain level of seal strength suitable for a peelable seal at a low-temperature sealing condition (for example, 120° C. to 140° C.) over a broad temperature range when a sealing layer is formed by extrusion coating (particularly, extrusion coating having a processing temperature condition of 260 to 300° C.).

There is also a need for a layered film which includes a sealing layer which exhibits high seal strength suitable for a lock seal at a high-temperature sealing condition (for example, 170° C. or higher) and exhibits a certain level of seal strength suitable for a peelable seal at a low-temperature scaling condition (for example, 120° C. to 140° C.) over a broad temperature range; and a need for a method for producing such film.

Means for Solving the Problem

The present inventors have found that the above problems can be solved by selecting homopolypropylene as a propylene-based polymer, determining the content of the homopolypropylene, and determining the overall melt flow rate of the resin composition at or above a certain value, in a resin composition which includes at least one of a copolymer of ethylene and α,β-unsaturated carboxylic acid or an ionomer thereof and a propylene-based polymer, Based on such fact, the inventors have completed this invention.

Following are specific measures of solving the above problems:

<1> A resin composition for extrusion coating, the composition including a component (1) that is at least one of a copolymer of ethylene and α,β-unsaturated carboxylic acid or an ionomer thereof, and a component (2) that is a homopolypropylene,
wherein a content of the component (2) is from 3 to 12% by mass, based on a total mass of the component (1) and the component (2), and
wherein the composition has a melt flow rate (at a load of 2160 g at 190° C., JIS K7210) of 4.0 g/10 min. or more.

<2> The resin composition for extrusion coating as described in <1>, wherein the composition has a melt flow rate (at a load of 2160 g at 190° C., HS K7210) of from 4.0 to 30.0 g/10/min.

<3> The resin composition for extrusion coating as described in <1> or <2>, wherein the component (2) has a melt flow rate (at a load of 2160 g at 230° C., JIS K7210) of from 0.5 to 35.0 g/1.0 min.

<4> The resin composition for extrusion coating as described in any one of <1> to <3>, wherein the component (1) comprises a component (a) that is at least one of a copolymer of ethylene and α,β-unsaturated carboxylic acid or an ionomer thereof, which has a melt flow rate (at a load of 2160 g at 190° C., HS K7210) of from 6.0 to 30.0 g/10 min.

<5> The resin composition for extrusion coating as described in <4>, wherein the content of the component (a) is from 60% by mass to 97% by mass, based on the total mass of the component (1) and the component (2).

<6> The resin composition for extrusion coating as described in any one of <1> to <5>, wherein the composition is used in extrusion coating at a processing temperature of from 260 to 300° C.

<7> A method for producing a layered film, the method comprising forming a sealing layer by extrusion coating a substrate film with the resin composition for extrusion coating as described in any one of <1> to <6> at a processing temperature of from 260 to 300° C.

<8> A layered film produced by the method for producing a layered film as described in <7>.

Effects of the Invention

The present invention can provide a resin composition for extrusion coating which exhibits high seal strength suitable for a lock seal at a high-temperature sealing condition (for example, 170° C. or higher) and exhibits a certain level of seal strength suitable for a peelable seal at a low-temperature sealing condition (for example, 120° C. to 140° C.) over a broad temperature range when a sealing layer is formed by extrusion coating (particularly, extrusion coating having a processing temperature condition of 260 to 300° C.).

The present invention can also provide a layered film which includes a scaling layer which exhibits high seal strength at a high-temperature sealing condition (for example, 170° C. or higher) and exhibits a certain level of seal strength suitable for a peelable seal at a low-temperature sealing condition (for example, 120° C. to 140° C.) over a broad temperature range (preferably, over a temperature range of 20° C.); and a method for producing such film.

BEST MODE FOR CARRYING OUT THE INVENTION

Figure 1:
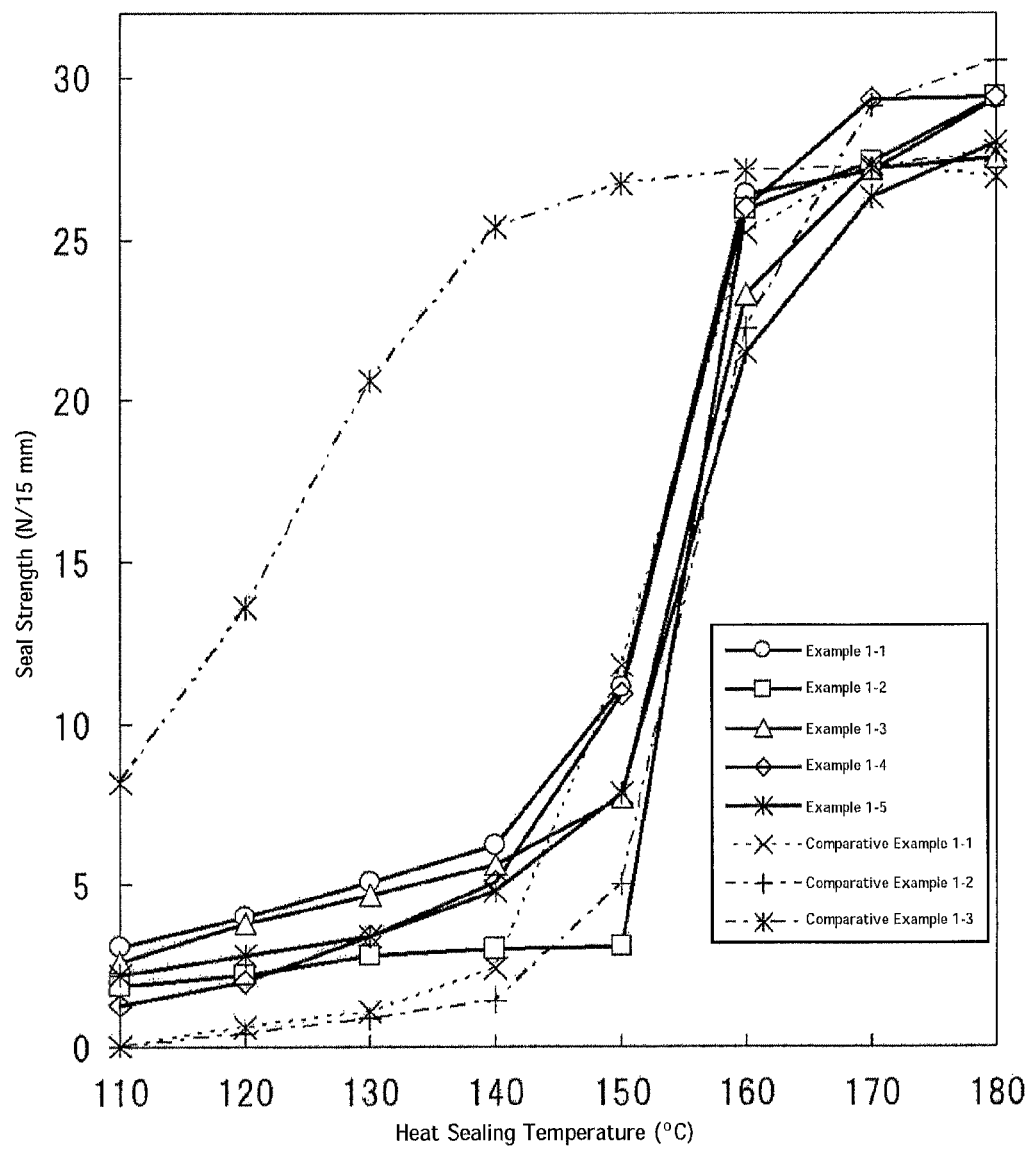
FIG. 1 is a graph illustrating a relationship between the seal temperature and the seal strength of layered films produced by extrusion coating the resin composition in the Examples and the Comparative Examples using a 40 mm laminator.

Now, the resin composition for extrusion coating of the present invention (hereinafter also simply referred to as "the resin composition of the present invention" or "the resin composition") will be described in detail.

The resin composition of the present invention includes (1) at least one of a copolymer of ethylene and α,β-unsaturated carboxylic acid and an ionomers thereof (hereinafter also referred to as "the component (1)") and (2) a homopolypropylene (hereinafter also referred to as "the component (2)"). The composition includes the component (2) in an amount of 3-12% by mass based on the total mass of the component (1) and the component (2) and has a melt flow rate (at a condition of load of 2160 g and 190° C., JIS K7210) of 4.0 g/10 min. or more.

Since a resin composition has constitution of the present invention, high seal strength suitable for a lock seal (for example, looking see cohesive failure at 20.0 N/15 mm or more) is exhibited at a high-temperature sealing condition (for example, 170° C. or higher) and a certain level of seal strength suitable for a peelable seal (for example, about 2.0 to 7.0 N/15 mm) over a broad temperature range at a low-temperature sealing condition (for example, 120° C. to 140° C.), when a sealing layer is formed with the resin composition by extrusion coating (particularly, extrusion coating having a processing temperature condition of 260 to 300° C.).

In the present invention, "extrusion coating at a processing temperature of 260 to 300° C." refers to a process of placing the composition in a laminator for melt extrusion and extrusion coating the composition at a resin temperature of 260 to 300° C.

If the resin composition does not include at least one of the component (1) and the component (2), it is difficult to exhibit a certain level of seal strength suitable for a peelable seal (for example, about 2.0 to 7.0 N/15 mm) at a low-temperature sealing condition (for example, 120° C. to 140° C.) over a broad temperature range, when a sealing layer is formed with the resin composition by extrusion coating (particularly, extrusion coating having a processing temperature condition of 260 to 300° C.).

As described, above, the resin composition of the present invention includes the component (2) in an amount of 3 to 12% by mass, based on the total mass of the component (1) and the component (2).

If the resin composition includes the component (2) in an amount of less than 3% by mass based, on the total mass of the component (1) and the component (2), the resulting layer tends to exhibit extremely high seal strength at a low-temperature sealing condition.

If the resin composition includes the component (2) in an amount of more than 12% by mass based on the total mass of the component (1) and the component (2), the resulting layer tends to exhibit insufficient seal strength at a low-temperature sealing condition and a high-temperature sealing condition.

More preferably, the content of the component (2) is 4 to 10% by mass based on the total mass of the component (1) and the component (2).

As described above, the resin composition of the present invention has a melt flow rate (at a load of 2160 g and 190° C., JIS K7210) of 4.0 g/10 min, or more.

If the resin composition has a melt flow rate of less than 4.0 g/10 min., the resulting layer tends to exhibit extremely low seal strength at a low-temperature sealing condition.

The resin composition preferably has a melt flow rate of 5.0 g/10 min, or more and more preferably 6.0 g/10 min, or more.

The upper limit of the melt flow rate (at a load of 2160 g and 190° C., JIS K7210) is not critical. For example, if the processing temperature of extrusion coating is decreased to 240° C., molding process can be successfully carried out, even the composition has a melt flow rate of 30.0 g/10 min. Furthermore, the composition has a melt flow rate of 20.0 g/10 min in the viewpoint of favorable outcome. If the processing temperature of extrusion coating is set at 260° C. or more, the upper limit of the melt flow rate is preferably 15.0 g/10 min., more preferably 130 g/10 min., and still more preferably 12.0 g/10 min.

The resin composition of the present invention which has a melt flow rate of 30.0 g/10 min. or less allows the processing temperature in extrusion coating to be readily maintained at low temperatures to high temperatures (240 to 300° C.). Especially, the resin composition having a melt flow rate of 15.0 g/10 min. or less can be extrusion coated at a processing temperature of 260 to 300° C., which can further increase production speed and further improve adhesion to the substrate.

<Copolymer of Ethylene and α,β-unsaturated Carboxylic Acid and Ionomer Thereof (the Component (1))>

The component (1) of the resin composition of the present invention is at least one of a copolymer of ethylene and α,β-unsaturated carboxylic acid or an ionomer thereof.

Preferred examples of the copolymer of ethylene and α,β-unsaturated carboxylic acid and the ionomer thereof (the ionomer of the copolymer of ethylene and α,β-unsaturated carboxylic acid) are described below.

The resin composition of the present invention may include only one or more of the components (1).

The resin composition of the present invention includes the component (1) in an amount (a total amount, in a case in which the composition includes two or more of the components) of 88 to 97% by mass and preferably 90 to 96% by mass, based on the total mass of the component (1) and the component (2).

Preferably, the component (1) includes a component (a) that is at least one of a copolymer of ethylene and α,β-unsaturated carboxylic acid or an ionomer thereof which have a melt flow rate (at a load of 2160 g and 190° C., HS K7210) of 6.0 to 30.0 g/10 min. (hereinafter also referred to as "component (a)").

Inclusion of the component (a) in the component (1) allows the overall melt flow rate (at a load of 2160 g and 190° C. JIS K7210) of the resin composition to be more readily adjusted to 4.0 g/10 min. or more.

In a case in which the component (1) includes the component (a), the resin composition preferably includes the component (a) in an amount of from 60% by mass to 97% by mass and more preferably from 62% by mass to 95% by mass, based on the total mass of the component (1) and the component (2).

In a case in which the component (1) consists of only the component (a), the resin composition includes the component (a) in an amount of 88 to 97% by mass and preferably 90 to 96% by mass, based on the total mass of the component (1) and the component (2).

The component (a) preferably has a melt flow rate as described above of 6.0 to 25.0 g/10 min. in the viewpoint of improving the effects of the present invention.

In a case in which the component (1) includes the component (a), the component (1) may also include (b) at least one of a copolymer of ethylene and α,β-unsaturated carboxylic acid or an ionomer thereof which have a melt flow rate (at a load of 2160 g and 190° C., JIS K7210) of 0.5 to 3.0 g/10 min., which is lower than the melt flow rate of the component (a) (hereinafter also simply referred to as "component (b)"), in addition to the component (a).

This allows the overall melt flow rate (at a load of 2160 g and 190° C., JIS K7210) of the resin composition to be more readily adjusted to 4.0 g/10 min. or more.

In the present invention, a melt flow rate (at a load of 2160 g and 190° C., JIS K7210) of 0.5 to 3.0 g/10 min. may be simply referred to as "low MFR", while a melt flow rate (at a load of 2160 g and 190° C., JIS K7210) of 6.0 to 30.0 g/10 min. may be simply referred to as "high MFR".

In a case in which the component (1) includes the component (a) and the component (b), the content of the component (a) is preferably 60% by mass to less than 97% by mass based on the total mass of the component (1) and the component (2), and the content of the component (b) is more than 0% by mass and is no more than 30% by mass based on the total mass of the component (1) and the component (2).

More preferably, the content of the component (a) is from 62% by mass to 95% by mass based on the total mass of the component (1) and the component (2), and the content of the component (b) is from 2% by mass to 28% by mass based on the total mass of the component (1) and the component (2).

Still more preferably, the content of the component (a) is from 62% by mass to 87% by mass based on the total mass of the component (1) and the component (2), and the content of the component (b) is from 10% by mass to 28% by mass based on the total mass of the component (1) and the component (2).

Examples of the combination of the components of the resin composition of the present invention are listed below, although the combination of the components of the resin composition of the present invention is not limited thereto.

Combination (A): Combination of a high MFR copolymer of ethylene and α,β-unsaturated carboxylic acid as the component (a) and a homopolypropylene as the component (2)

Combination (B): Combination of an ionomer of a high MFR copolymer of ethylene and α,β-unsaturated carboxylic acid as the component (a) and a homopolypropylene as the component (2)

Combination (C): Combination of a high MFR copolymer of ethylene and α,β-unsaturated carboxylic acid as the component (a), a low MFR copolymer of ethylene and α,β-unsaturated carboxylic acid as the component (b), and a homopolypropylene as the component (2)

Combination (D): Combination of an ionomer of a high MFR copolymer of ethylene and α,β-unsaturated carboxylic acid as the component (a), an ionomer of a low MFR copolymer of ethylene and α,β-unsaturated carboxylic acid as the component (b), and a homopolypropylene as the component (2)

Combination (E): Combination of a high MFR copolymer of ethylene and α,β-unsaturated carboxylic acid as the component (a), an ionomer of a low MFR copolymer of ethylene and α,β-unsaturated carboxylic acid as the component (b), and a homopolypropylene as the component (2)

Combination (F): Combination of an ionomer of a high MFR copolymer of ethylene and α,β-unsaturated carboxylic acid as the component (a), a low MFR copolymer of ethylene and α,β-unsaturated carboxylic acid as the component (b), and a homopolypropylene as the component (2)

Among the above combinations, the combination (A) or (B) is preferred to form a film coating layer having a good surface appearance and to further improve the effects of the present invention.

(Copolymer of Ethylene and α,β-unsaturated Carboxylic Acid)

The copolymer of ethylene and α,β-unsaturated carboxylic acid as the component (1) is a polymer formed by copolymerizing at least ethylene and monomer(s) selected from α,β-unsaturated carboxylic acid as copolymerization components. If necessary, monomer(s) other than the unsaturated carboxylic acid may be copolymerized.

The copolymer of ethylene and α,β-unsaturated carboxylic acid is preferably a binary random copolymer of ethylene and α,β-unsaturated carboxylic acid, in the viewpoint of providing higher seal strength than conventional one of a peelable seal portion formed by low temperature sealing and obtaining stably the seal strength over a broad temperature range.

Examples of the α,β-unsaturated carboxylic acid include unsaturated carboxylic acid, having from 4 to 8 carbon atoms such as acrylic acid, methacrylic acid, ethacrylic acid, itaconic acid, itaconic acid anhydride, fumaric acid, crotonic acid, maleic acid, maleic anhydride, maleic acid monoesters (such as maleic acid monomethyl and maleic acid monoethyl), and maleic anhydride monoesters (such as maleic anhydride monomethyl and maleic anhydride monoethyl), or half esters.

Among them, acrylic acid and methacrylic acid are preferred.

Examples of the monomer other than the α,β-unsaturated carboxylic acid, which the monomer may be copolymerized, include esters of α,β-unsaturated carboxylic acid with alkyl having from 1 to 8 carbon atoms such as, for example, methyl acrylate, ethyl acrylate, isopropyl acrylate, isobutyl acrylate, normal butyl acrylate, 2-ethylhexyl acrylate, methyl methacrylate, ethyl methacrylate, isopropyl methacrylate, isobutyl methacrylate, normal butyl methacrylate, and 2-ethylhexyl methacrylate, and vinyl esters such as, for example, vinyl acetate and vinyl propionate. Other examples of the monomer which may be copolymerized include carbon monoxide, glycidyl acrylate, and glycidyl methacrylate. It should be appreciated that these monomers may be copolymerized alone or in combination.

To further improve the effects of the present invention, the component (1) preferably does not substantially include a constitutional unit derived from an α,β-unsaturated carboxylic acid ester. As used herein, "does not substantially include" means that the component (1) does not include actively constitutional units derived from an α,β-unsaturated carboxylic acid ester. In other words, the component (1) may include a small amount of the constitutional unit derived from an α,β-unsaturated carboxylic acid ester which do not detract from the purposes of the present invention. More specifically "does not substantially include" means that the content of the constitutional unit derived from an α,β-unsaturated carboxylic acid ester in the component (1) is 2.0% by mass or less, The amount is preferably 1.5% by mass or less, more preferably 1.0% by mass or less, still more preferably less than 1.0% by mass, and especially preferably 0.5% by mass or less.

The polymerization rate of the constitutional unit derived from an α,β-unsaturated carboxylic acid in the copolymer of ethylene and α,β-unsaturated carboxylic acid is 1 to 25% by mass and more preferably 2 to 20% by mass based on the total mass of the copolymer. To provide low temperature sealing property, a rate of copolymerization of the constitutional unit derived from an α,β-unsaturated carboxylic acid is 1% by mass or more and preferably 2% by mass or more.

(Ionomer of Copolymer of Ethylene and α,β-unsaturated Carboxylic Acid)

The ionomer of a copolymer of ethylene and α,β-unsaturated carboxylic acid in the component (1) is based on a copolymer of ethylene and α,β-unsaturated carboxylic acid, and the carboxylic acid groups in the base polymer are crosslinked with metal ions.

Examples of the base polymer of the ionomer include the copolymers of ethylene and α,β-unsaturated carboxylic acid as listed above, and the preferred types are also as described above.

Examples of the metal ions include ions of monovalent metals such as lithium, sodium, potassium, and cesium; divalent metals such as magnesium, calcium, strontium, barium, copper, and zinc; and trivalent metals such as aluminum and iron, Among them, ions of sodium and zinc are preferred to improve the sealability of the seal portion.

The ionomer preferably has a neutralization of 10% or more.

The ionomer preferably has a neutralization of 10 to 40%. The ionomer having a neutralization of 10% or more can provide a stronger heat seal, while the ionomer having a neutralization of 40% or less offers benefits in terms of flowability for molding.

The neutralization refers to rate (%) of the carboxylic acid groups neutralized with metal ions in the copolymer of ethylene and α,β-unsaturated carboxylic acid (base polymer).

Specific examples of the copolymer of ethylene and α,β-unsaturated carboxylic acid, and the ionomer thereof include a copolymer of ethylene and acrylic acid, a copolymer of ethylene and methacrylic acid, and an ionomer which includes such copolymer as the base resin. Commercial examples of such copolymer and ionomer include, for example, the trade name of HIMILAN series and NUCREL series from Dupont-Mitsui Polychemicals Co., Ltd. and the trade name of SURLYN series from E. I. du Pont de Nemours and Company. Examples of the copolymer of ethylene and α,β-unsaturated carboxylic acid, the copolymer including a copolymerizable monomer other than the α,β-unsaturated carboxylic acid include ELVALOY series and BYNEL series commercially available from E. I. du Pont de Nemours and Company.

Examples of the "NUCREL" series include, for example, AN4214C, N0903HC, N0908C, N410, N1035, N1050H, N1108C, N1110H, N1207C, N1214, N1525, N1560, N0200H, AN4311, AN4213C, and N035C.

Examples of the "HIMILAN" series include, for example, 1554, 1554W, 1555, 1557, 1601, 1605, 1650, 1652, 1652 SR, 1652 SB, 1702, 1705, 1706, 1707, 1855, and 1856.

The copolymer of ethylene and α,β-unsaturated carboxylic acid can be formed by, for example, copolymerizing ethylene and α,β-unsaturated carboxylic acid (and, if necessary, another unsaturated monomer) by high-pressure radical polymerization. The ionomer of such copolymer can be produced by, for example, neutralizing the copolymer of ethylene and α,β-unsaturated carboxylic acid according to routine procedures.

<Homopolypropylene (the Component (2))>

The resin composition of the present invention includes a homopolypropylene (propylene homopolymer), that is, crystalline polypropylene, as the component (2).

Since the homopolypropylene is included in the resin composition of the present invention, when a sealing layer is formed with the resin composition by extrusion coating (particularly, extrusion coating having a processing temperature condition of 260 to 300° C.), a wider range of seal temperature exhibited seal strength suitable for a peelable seal is spread.

The homopolypropylene (the component (2)) preferably has a melt flow rate (at a load of 2160 g and at 230° C., JIS K7210) of 0.5 to 35 g/1.0 min., more preferably 1.0 to 35 g/10 min., and still more preferably 2.0 to 35 g/10 min.

If the homopolypropylene has a melt flow rate of 0.5 g/10 min. or more, the resulting layer exhibits seal strength suitable for a peelable seal over a broader sealing temperature span.

If the homopolypropylene has a melt flow rate of 35 g/10 min. or less, the resulting layer exhibits seal strength suitable for a peelable seal over a broader sealing temperature span.

The resin composition of the present invention may include only one or more of the homopolypropylenes (the components (2)).

The resin composition includes the component (2) in the amount as described above.

In addition to the above components, the resin composition of the present invention may further include, if necessary, an additive such as an antioxidant, a weathering stabilizer, a lubricant, and an antifog agent, to the extent that it does not interfere with the effects of the present invention.

The resin composition of the present invention may include a polyolefin other than the homopolypropylene, to the extent that it does not interfere with the effects of the present invention.

Examples of the polyolefin other than the homopolypropylene can include polyethylenes such as high density polyethylenes, high pressure low density polyethylenes, and linear low density polyethylenes; ethylene α-olefin copolymer elastomers with reduced or no crystallinity produced by increasing the amount of an α-olefin other than ethylene (such as propylene, butene, hexene, and octene), the α-olefin to be copolymerized with the ethylene; propylene copolymers (copolymers of propylene and an α-olefin other than propylene); polybutenes; and other olefin (co)polymers; and polymer blends thereof.

The resin composition of the present invention can be prepared by simultaneously or sequentially dry blending or melt blending the individual components described above.

In a case in which the individual components are dry blended, the components are melt plastified and uniformly melt mixed in a molding machine. In a case in which the components are meld blended, the components are mixed in a mixer such as a single-screw extruder, a twin-screw extruder, a Banbury mixer, a roll, and a kneader. The melt blending is preferred in view of the ability to mix the individual components. The components may be mixed in any order.

The resin composition of the present invention can be used by, as a seal material, applying, by extrusion coating, the composition onto a substrate (for example, a substrate film) such as a polyester (for example, polyethylene terephthalate), a polyamide, a polyvinylidene chloride, a saponified copolymer of ethylene and vinyl acetate, a polystyrene, a polybutene, a polypropylene, a polyethylene, paper, aluminum foil, and a metal oxide deposited film.

In particular, extrusion coating of the composition at a processing temperature of 260 to 300° C. allows the effects of the present invention to be enhanced.

The resin composition of the present invention may be applied onto the substrate via adhesive or may be directly applied onto the surface of the substrate. The additive can be selected from known anchor coating agents such as adhesive compositions produced by adding a cross-linking agent to an ethylene-based resin such as a high pressure low density polyethylene, a polyester polyol, or a polyester urethane polyol formed by chain extension with an isocyanate compound having a isocyanate functionality greater than 1, or a combination thereof.

The surface of the substrate onto which the resin composition of the present invention is to be applied may be pretreated by a known method such as, for example, corona discharge treatment to improve the adhesion.

In particular, the resin composition of the present invention can be used to form a sealing layer on the substrate film as described above by extrusion coating at a processing temperature of 260-300° C., thereby producing a layered film which includes a sealing layer exhibiting high seal strength (for example, 20N/15 mm or more) at a high-temperature sealing condition (for example, 170° C. or higher) and exhibiting a certain level of seal strength (for example, about 2.0 to 7.0 N/1.5 mm) at a low-temperature sealing condition (for example, 120° C. to 140° C.) over a broad temperature span.

EXAMPLES

Now, the present invention will be described more specifically with reference to the Examples, although the present invention is not limited to the Examples below, without departing from the spirit of the present invention.

The melt flow rate (MFR) was measured according to JIS K7210-1999.

Example 1-1

Preparation of Resin Composition

The individual components of the composition shown in "Example 1-1" in the Table 1 were melt blended in a single-screw extruder (with a diameter of 40 mm and a head of Dulmage screw) at a resin temperature of 179° C. (set temperatures: C1/C2/C3-D=140° C./160° C./180° C.) and a screw speed of 50 rpm to provide a resin composition.

As used herein, "resin temperature" refers to a temperature of the resin in the extruder during the melt-blending. "C1", "C2", "C3", "D", and "C3-D" refer to the feeding zone, the compression zone, the meterring zone, the die part, and zone of from the C3 to the D, respectively.

Following are the details of the individual components shown in Table 1:

EMAA 1

Copolymer of Ethylene and Methacrylic Acid

[ethylene content: 91% by mass, methacrylic acid content: 9% by mass, MFR (at a load of 2160 g at 190° C.): 1.5 g/10 min.]

EMAA 2

Copolymer of Ethylene and Methacrylic Acid

[ethylene content: 88% by mass, methacrylic acid content: 12% by mass, MFR (at a load of 2160 g at 190° C.): 13.5 g/10 min.]

EMAA 3

Copolymer of Ethylene and Methacrylic Acid

[ethylene content: 85% by mass, methacrylic acid content: 15% by mass, MFR (at a load of 2160 g at 190° C.): 25.0 g/10 min.]

EMAA 4

Copolymer of Ethylene, Methacrylic Acid, and Isobutyl Acrylate

[ethylene content: 81% by mass, methacrylic acid content: 11% by mass, isobutyl acrylate content: 8% by mass, MFR (at a load of 2160 g at 190° C.): 10.0 g/10 min.]

Ionomer 1

Zinc ionomer of the copolymer of ethylene and methacrylic acid [ethylene content: 88% by mass, methacrylic acid content: 12% by mass] [neutralization: 36%, MFR (at a load of 2160 g at 190° C.): 1.5 g/10 min.]

Ionomer 2

Zinc ionomer of the copolymer of ethylene, methacrylic acid, and isobutyl acrylate [ethylene content: 80% by mass, methacrylic acid content 10% by mass, isobutyl acrylate content: 10% by mass] [neutralization: 70%, MFR (at a load of 2160 g at 190° C.): 1.0 g/10 min.]

Homo PP 1

Homopolypropylene

[MFR (at a load of 2160 g at 230° C.): 3.0 g/10 min., density: 910 kg/m$^3$, F113G from Prime Polymer Co., Ltd.]

Homo PP 2

Homopolypropylene

[MFR (at a load of 2160 g 230° C.): 30.0 g/10 min., density: 910 kg/m$^3$, F109V from Prime Polymer Co., Ltd.]

Random PP 1

Random copolymer of propylene and ethylene

[MFR (at a load of 2160 g at 230° C.): 25.0 g/10 min., density: 910 kg/m$^3$, F329RA from Prime Polymer Co., Ltd.]

<Evaluation>

A layered substrate of polyethylene terephthalate with a thickness of 12 μm [PET (12)] and polyethylene with a thickness of 15 μm [PE (15)] was prepared, and the substrate was extrusion coated with the resin composition as described above to form a sealing layer with a thickness of 30 μm [sealing layer (30)] on the PE (15), thereby providing a layered film of the PET (12), the PE (15), and the sealing layer (30).

For the extrusion coating, a laminator with a diameter of 40 mm (with a full flighted screw) was used at a resin temperature (processing temperature) of 298° C. (set temperatures: C1/C2/C3-D=180° C./260° C./300° C.), a screw speed of 100 rpm, and a processing rate of 30 m/min.

As used herein, "resin temperature (processing temperature)" refers to a temperature of the resin in the extrusion coater during melting the resin composition.

Next, the resulting layered film was folded with the side of the sealing layer (30) inside and heat sealed using a bar heat sealer (for one sided heating) at an actual pressure of 0.2 MPa for a seal time of 0.5 seconds.

The heat seal portion formed was peeled using a tensile tester (a peel rate of 300 mm/min., a peeling angle of T-type, a test specimen width of 15 mm) to measure the peel strength during peeling as the seal strength (N/15 mm)

The heat sealing temperature was changed as shown in the Table 2 and the seal strength at each of the seal temperatures was measured to evaluate the peelable sealability and the lock sealability.

The evaluation results are shown in the Table 2 below and FIG. 1.

Examples 1-2 to 1-5 and Comparative Examples 1-1 to 1-3

Resin compositions were prepared in the same manner as the manner in the Example 1-1 except that the composition in "Preparation of Resin Composition" was changed to the composition shown in the Table 1 below, and the resulting compositions were evaluated in the same manner as the manner in the Example 1-1.

The evaluation results are shown in the Table 2 and FIG. 1.

strength of 20 N/15 mm or more suitable for a lock seal at a high-temperature sealing condition of 170° C. or higher.

On the other hand, the Comparative Examples 1-1 to 1-2 exhibited an insufficient seal strength unsuitable for a peel-

TABLE 1

| | MFR (g/10 min.) | MAA (% by mass) | IBA (% by mass) | Neutralization (%) | Composition of Resin Composition (% by mass) | | | | | | | |
|---|---|---|---|---|---|---|---|---|---|---|---|---|
| | | | | | Example 1-1 | Example 1-2 | Example 1-3 | Example 1-4 | Example 1-5 | Comparative Example 1-1 | Comparative Example 1-2 | Comparative Example 1-3 |
| EMAA 1 | 1.5 (190° C.) | 9 | — | — | 25 | 25 | 25 | 25 | — | — | — | — |
| EMAA 2 | 13.5 (190° C.) | 12 | — | — | 67 | 67 | 65 | — | 67 | — | — | — |
| EMAA 3 | 25.0 (190° C.) | 15 | — | — | — | — | — | 67 | — | — | — | — |
| EMAA 4 | 10.0 (190° C.) | 11 | 8 | — | — | — | — | — | — | 46 | 46 | 46 |
| Ionomer 1 | 1.5 (190° C.) | 12 | — | 36% | — | — | — | — | 25 | — | — | — |
| Ionomer 2 | 1.0 (190° C.) | 10 | 10 | 70% | — | — | — | — | — | 46 | 46 | 46 |
| Homo PP 1 | 3.0 (230° C.) | — | — | — | 8 | — | 10 | 8 | 8 | 8 | — | — |
| Homo PP 2 | 30.0 (230° C.) | — | — | — | — | 8 | — | — | — | — | 8 | — |
| Random PP 1 | 25.0 (230° C.) | — | — | — | — | — | — | — | — | — | — | 8 |
| MFR of Resin Composition (190° C.) (g/10 min.) | | | | | 7.0 | 8.0 | 6.3 | 11.1 | 8.2 | 3.0 | 3.2 | 42 |

TABLE 2

| | Heat Seal Strength (N/15 mm) | | | | | | | |
|---|---|---|---|---|---|---|---|---|
| Heat Sealing Temperature (° C.) | Example 1-1 | Example 1-2 | Example 1-3 | Example 1-4 | Example 1-5 | Comparative Example 1-1 | Comparative Example 1-2 | Comparative Example 1-3 |
| 110 | 3.1 | 1.9 | 2.6 | 1.3 | 2.2 | 0 | 0 | 8.2 |
| 120 | 4.0 | 2.2 | 3.8 | 2.0 | 2.8 | 0.6 | 0.4 | 13.6 |
| 130 | 5.1 | 2.8 | 4.7 | 3.4 | 3.4 | 1.1 | 0.9 | 20.6* |
| 140 | 6.2 | 3.0 | 5.6 | 5.1 | 4.8 | 2.4 | 1.4 | 25.4* |
| 150 | 11.1 | 3.1 | 7.7 | 10.9 | 7.8 | 11.8 | 5.0 | 26.7* |
| 160 | 26.4* | 25.9 | 23.3* | 26.0* | 21.5* | 25.2* | 22.2* | 27.1* |
| 170 | 27.1* | 27.4* | 27.2* | 29.3* | 26.3* | 27.3* | 29.1* | 27.2* |
| 180 | 29.3* | 29.4* | 27.5* | 29.4* | 28.0* | 26.9* | 30.5* | 27.7* |

The MFR (at 190° C.) (g/10 min.) of each of the resin compositions shown in the Table 1 was measured at a load of 2160 g at 190° C. according to JIS K7210 for the resulting resin compositions.

The Table 2 and FIG. 1 show the relationship between the heat sealing temperature and the heat seal strength for the layered films produced using the 40 mm laminator as an extrusion coater.

In the Table 2, among the values of the heat seal strength, the values with "*" show that cohesive failure was looked see on the peeled surface.

In the Table 2, among the values of the heat seal strength, the values without "*" show that interfacial peeling was exhibited.

As shown in the Table 2 and FIG. 1, the Examples 1-1 to 1-5 constantly exhibited a seal strength of 2.0-7.0 N/15 mm suitable for a peelable seal at a low-temperature sealing condition of about 120° C. to 140° C. over a broad temperature span. Additionally, the Examples 1-1 to 1-5 exhibited a seal able seal at a low-temperature sealing condition of 120° C. to 140° C. (especially 120 to 130° C.).

The Comparative Examples 1-3 exhibited an extremely high seal strength unsuitable for a peelable seal at a low-temperature sealing condition of 120° C. to 140° C.

Example 2-1

<Preparation of Resin Composition>

The individual components of the composition shown in "Example 2-1" in the Table 3 were melt blended in a single-screw extruder (with a diameter of 65 mm and a head of Dulmage screw) at a resin temperature of 194° C. (set temperatures: C1/C2-D=150° C./200° C.) and a screw speed of 35 rpm to provide a resin composition.

As used herein, "resin temperature" refers to a temperature of the resin in the extruder during the melt-blending. "C1" is described above and "C2-D" refer to the C2 (compression zone) to the D (die zone), respectively.

The details of the individual components shown in the Table 3 are the same as above details of the components shown in the Table 1, except for "EMAA5".

The details of the EMAA5 are as follows:
EMAA 5
Copolymer of ethylene and methacrylic acid
[ethylene content: 91% by mass, methacrylic acid content: 9% by mass, MFR (at a load of 2160 g at 190° C.): 8.0 g/10 min.]

<Evaluation>

A layered substrate of polyethylene terephthalate with a thickness of 12 μm [PET (12)]/polyethylene with a thickness of 15 μm [PE (15)] was prepared, and the substrate was extrusion coated with the resin composition as described above to form a sealing layer with a thickness of 25 μm [sealing layer (25)] on the PE (15), thereby providing a layered film of the PET (12)/the PE (15)/the sealing layer (25).

For the extrusion coating, a laminator with a diameter of 65 mm (with a double flighted screw) was used at a resin temperature (processing temperature) of 292° C. (set temperatures: C1/C2/C3-D=180° C./260° C./290° C.), a screw speed of 110 rpm, and a processing rate of 80 m/min.

As used herein, "resin temperature (processing temperature)" refers to a temperature of the resin in the extrusion coater during melting the resin composition.

The resulting layered film was evaluated in the same manner as the manner in the Example 1-1.

Figure 2:
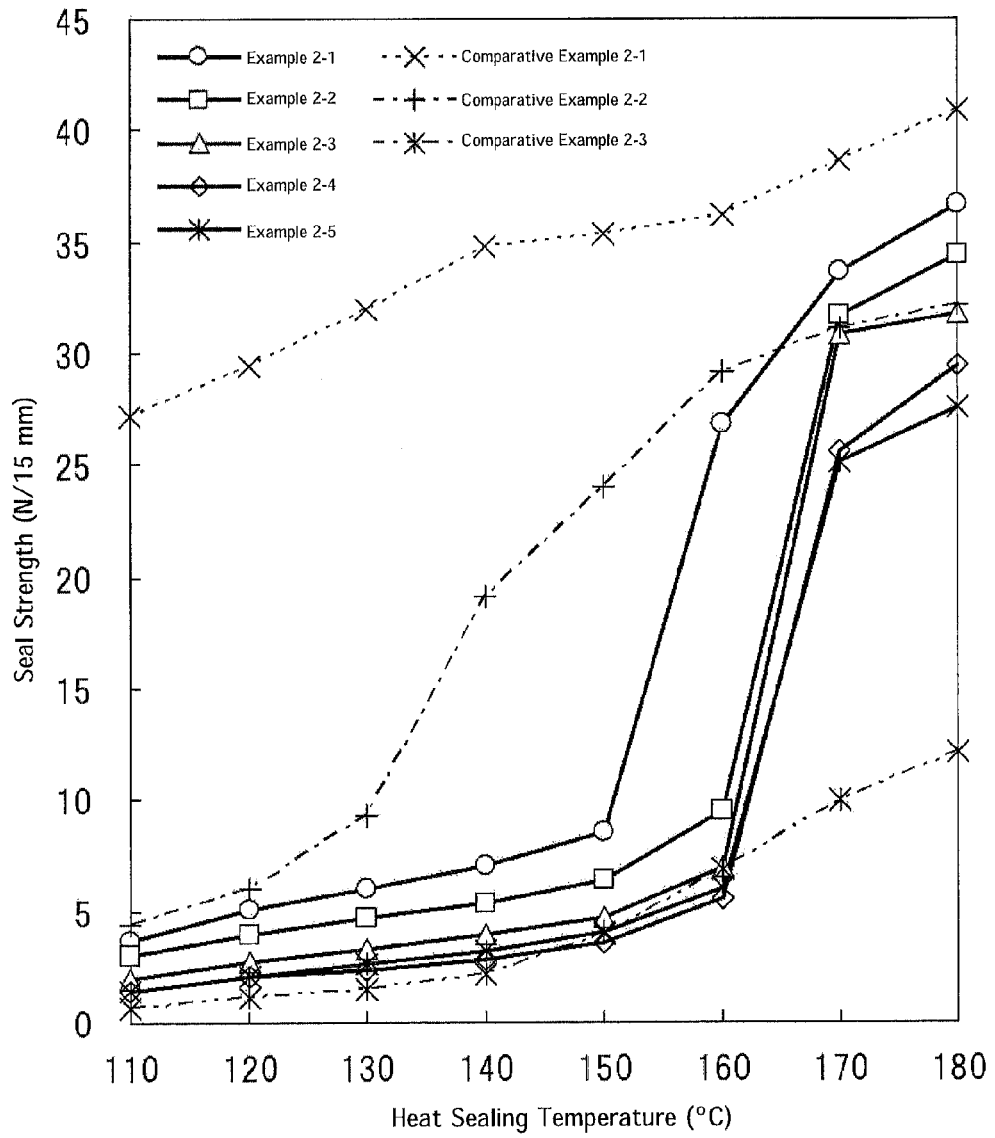
FIG. 2 is a graph illustrating a relationship between the seal temperature and the seal strength of layered films produced by extrusion coating the resin composition in the Examples and the Comparative Examples using a 65 mm laminator.

The evaluation results are shown in the Table 4 and FIG. 2.

Examples 2-2 to 2-5 and Comparative Examples 2-1 to 2-3

Resin compositions were prepared in the same manner as the manner in the Example 2-1 except that the composition in "Preparation of Resin Composition" was changed to the composition shown in the Table 3 below, and the resulting compositions were evaluated in the same manner as the manner in the Example 2-1.

In the Example 2-3 and the Example 2-4, the same resin composition as the composition in the Example 1-1 and the Example 1-3, respectively, was used, The evaluation results are shown in the Table 4 below and FIG. 2.

TABLE 3

| | | | Composition of Resin Composition (% by mass) | | | | | | | |
|---|---|---|---|---|---|---|---|---|---|---|
| | MFR (g/10 min.) | MAA (% by mass) | Example 2-1 | Example 2-2 | Example 2-3 | Example 2-4 | Example 2-5 | Comparative Example 2-1 | Comparative Example 2-2 | Comparative Example 2-3 |
| EMAA 1 | 1.5 (190° C.) | 9 | 25 | 25 | 25 | 25 | — | 25 | 25 | 25 |
| EMAA 2 | 13.5 (190° C.) | 12 | 71 | 69 | 67 | 65 | — | 75 | 73 | 60 |
| EMAA 5 | 8.0 (190° C.) | 9 | — | — | — | — | 92 | — | — | — |
| Homo PP 1 | 3.0 (230° C.) | — | 4 | 6 | 8 | 10 | 8 | 0 | 2 | 15 |
| MFR of Resin Composition (190° C.) (g/10 min.) | | | 7.1 | 6.8 | 6.6 | 6.3 | 7.0 | 7.8 | 7.6 | 6.0 |

TABLE 4

| | Heat Seal Strength (N/15 mm) | | | | | | | |
|---|---|---|---|---|---|---|---|---|
| Heat Sealing Temperature (° C.) | Example 2-1 | Example 2-2 | Example 2-3 | Example 2-4 | Example 2-5 | Comparative Example 2-1 | Comparative Example 2-2 | Comparative Example 2-3 |
| 110 | 3.7 | 3.0 | 2.0 | 1.4 | 1.4 | 27.2 | 4.4 | 0.7 |
| 120 | 5.1 | 3.9 | 2.7 | 2.1 | 2.1 | 29.4* | 6.0 | 1.1 |
| 130 | 6.0 | 4.7 | 3.3 | 2.3 | 2.6 | 32.0* | 9.3 | 1.5 |
| 140 | 7.0 | 5.3 | 3.9 | 2.8 | 3.2 | 34.8* | 19.1 | 2.2 |
| 150 | 8.5 | 6.4 | 4.7 | 3.6 | 4.0 | 35.3* | 24.0 | 3.9 |
| 160 | 26.8* | 9.5 | 6.9 | 5.5 | 6.0 | 36.2* | 29.2* | 6.8 |
| 170 | 33.7* | 317* | 30.8* | 25.6* | 25.1* | 38.6* | 31.1* | 9.9* |
| 180 | 36.7* | 34.4* | 31.8* | 29.4* | 27.6* | 40.9* | 32.2* | 12.1* |

The MFR (at 190° C.) (g/10 min.) of the resin compositions shown in the Table 3 was measured at a load of 2160 g at 190° C. according to JIS K7210 for the resulting resin compositions.

The Table 4 and FIG. 2 show the relationship between the heat sealing temperature and the heat seal strength for the layered films produced using the 65 mm laminator as an extrusion coater.

In the Table 4, among the values of the heat seal strength, the values with "*" show that cohesive failure was looked see on the peeled surface.

In the Table 4, among the values of the heat seal strength, the values without "*" show that interfacial peeling was exhibited.

As shown in the Table 4, the Examples 2-1 to 2-5 constantly exhibited a seal strength of about 2.0 to 70N/15 mm suitable for a peelable seal at a low-temperature sealing condition of about 120° C. to 140° C. over a broad temperature span. Additionally, the Examples 2-1 to 2-5 exhibited a seal strength of 20 N/15 mm or more suitable for a lock seal at a high-temperature sealing condition of 170° C. or higher.

On the other hand, the Comparative Examples 2-1 to 2-3 exhibited an insufficient or extremely high seal strength unsuitable for a peelable seal at a low-temperature sealing condition of 120° C. to 140° C. (especially 120 to 130° C.).

The entire disclosure of Japanese Patent Application No. 2010-291268 is incorporated herein into this specification by reference.

All documents, patent applications and technical specifications recited in this specification are incorporated herein by reference in this specification to the same extent as if each individual publication, patent applications and technical standard was specifically and individually indicated to be incorporated by reference.

The invention claimed is:

1. A resin composition for extrusion coating, the composition comprising:
   a component (1) that comprises:
      least one of a copolymer of ethylene and α,β-unsaturated carboxylic acid or an ionomer thereof, which has a melt flow rate (at a load of 2160 g at 190° C., JIS K7210) of from 6.0 to 30.0 g/10 min, and
      at least one of a copolymer of ethylene and α,β-unsaturated carboxylic acid or an ionomer thereof, which has a melt flow rate (at a load of 2160 g at 190° C., JIS K7210) of from 0.5 to 3.0 g/10 min; and
   a component (2) that is a homopolypropylene,
   wherein a content of the component (2) is from 3 to 12% by mass, based on a total mass of the component (1) and the component (2), and
   wherein the composition has a melt flow rate (at a load of 2160 g at 190° C., JIS K7210) of 4.0 g/10 min. or more.

2. The resin composition for extrusion coating according to claim 1, wherein the composition has a melt flow rate (at a load of 2160 g at 190° C., JIS K7210) of from 4.0 to 30.0 g/10 min.

3. The resin composition for extrusion coating according to claim 1, wherein the component (2) has a melt flow rate (at a load of 2160 g at 230° C., JIS K7210) of from 0.5 to 35.0 g/10 min.

4. The resin composition for extrusion coating according to claim 1, wherein a content of the copolymer of ethylene and α,β-unsaturated carboxylic acid or an ionomer thereof having the melt flow rate of from 6.0 to 30.0 g/10 min is from 60% by mass to 97% by mass, based on the total mass of the component (1) and the component (2).

5. The resin composition for extrusion coating according to claim 1, wherein the composition is used in extrusion coating at a processing temperature of from 260 to 300° C.

6. A method for producing a layered film, the method comprising forming a sealing layer by extrusion coating a substrate film with a resin composition for extrusion coating at a processing temperature of from 260 to 300° C., the resin composition for extrusion coating comprising a component (1) that is at least one of a copolymer of ethylene and α,β-unsaturated carboxylic acid or an ionomer thereof, and a component (2) that is a homopolypropylene,
   wherein a content of the component (2) is from 3 to 12% by mass, based on a total mass of the component (1) and the component (2), and
   wherein the composition has a melt flow rate (at a load of 2160 g at 190° C., JIS K7210) of 4.0 g/10 min. or more.

7. A layered film produced by forming a sealing layer by extrusion coating a substrate film with a resin composition for extrusion coating at a processing temperature of from 260 to 300° C., the resin composition for extrusion coating comprising a component (1) that is at least one of a copolymer of ethylene and α,β-unsaturated carboxylic acid or an ionomer thereof, and a component (2) that is a homopolypropylene,
   wherein a content of the component (2) is from 3 to 12% by mass, based on a total mass of the component (1) and the component (2), and
   wherein the composition has a melt flow rate (at a load of 2160 g at 190° C., JIS K7210) of 4.0 g/10 min. or more.

8. The method according to claim 6, wherein the component (1) comprises:
   at least one of a copolymer of ethylene and α,β-unsaturated carboxylic acid or an ionomer thereof, which has a melt flow rate (at a load of 2160 g at 190° C., JIS K7210) of from 6.0 to 30.0 g/10 min, and
   at least one of a copolymer of ethylene and α,β-unsaturated carboxylic acid or an ionomer thereof, which has a melt flow rate (at a load of 2160 g at 190° C., JIS K7210) of from 0.5 to 3.0 g/10 min.

9. The layered film according to claim 7, wherein the component (1) comprises:
   at least one of a copolymer of ethylene and α,β-unsaturated carboxylic acid or an ionomer thereof, which has a melt flow rate (at a load of 2160 g at 190° C., JIS K7210) of from 6.0 to 30.0 g/10 min, and
   at least one of a copolymer of ethylene and α,β-unsaturated carboxylic acid or an ionomer thereof, which has a melt flow rate (at a load of 2160 g at 190° C., JIS K7210) of from 0.5 to 3.0 g/10 min.

* * * * *